United States Patent [19]
Henning et al.

[11] Patent Number: 4,910,339
[45] Date of Patent: Mar. 20, 1990

[54] ISOCYANATE DERIVATIVES CONTAINING CARBODIIMIDE GROUPS, A PROCESS FOR THEIR PRODUCTION AND THEIR USE AS ADDITIVES FOR AQUEOUS SOLUTIONS OR DISPERSIONS OF PLASTICS

[75] Inventors: Wolfgang Henning, Kuerten; Walter Meckel, Neuss, both of Fed. Rep. of Germany

[73] Assignee: Bayer Aktiengesellschaft, Leverkusen, Fed. Rep. of Germany

[21] Appl. No.: 845,153

[22] Filed: Mar. 27, 1986

[30] Foreign Application Priority Data

Apr. 11, 1985 [DE] Fed. Rep. of Germany ....... 3512918

[51] Int. Cl.$^4$ .................... C07C 119/055; C09K 3/00; C08G 18/34
[52] U.S. Cl. ...................... 564/252; 528/84; 252/183.11
[58] Field of Search ............ 528/67, 84; 560/334; 564/252; 252/183.11

[56] References Cited
U.S. PATENT DOCUMENTS 2,937,164  5/1960  Brown et al. .
3,388,087  6/1968  Dieterich et al. .
3,479,310  11/1969  Dieterich et al. .
3,480,592  11/1969  Dieterich et al. .
3,756,992  9/1973  Dieterich .
3,876,582  4/1975  Kaiser et al. .
3,905,929  9/1975  Noll .
3,905,929  9/1975  Noll .
4,029,617  6/1977  Dhein et al. .
4,094,842  6/1978  Wenzel et al. ................. 528/67
4,108,814  8/1978  Reiff .
4,119,658  10/1978  Dieterich .
4,123,423  10/1978  Wenzel .

FOREIGN PATENT DOCUMENTS 0121083  10/1984  European Pat. Off. .
2042902  3/1972  Fed. Rep. of Germany .

Primary Examiner—Alan Siegel
Attorney, Agent, or Firm—Joseph C. Gil; Thomas W. Roy

[57] ABSTRACT

The present invention is directed to isocyanate derivatives containing about 2 to 30% by weight of carbodiimide groups, —N=C=N—, on a statistical average at least about 0.8 carbodiimide groups per molecule, about 5 to 200 milliequivalents per 100 g of solids of chemically incorporated sulfonate groups and, optionally, 0 to about 25%, based on solids, of chemically incorporated ethylene oxide units, —CH$_2$—CH$_2$—O—, in polyether chains. The present invention is also directed to a process for the preparation of these isocyanate derivatives and to their use as additives for aqueous dispersions or solutions of plastics containing carboxyl groups or groups convertible into carboxyl groups.

5 Claims, No Drawings

4,910,339

ISOCYANATE DERIVATIVES CONTAINING CARBODIIMIDE GROUPS, A PROCESS FOR THEIR PRODUCTION AND THEIR USE AS ADDITIVES FOR AQUEOUS SOLUTIONS OR DISPERSIONS OF PLASTICS

BACKGROUND OF THE INVENTION

1. Field of the Invention

This invention relates to new isocyanate derivatives containing carbodiimide and sulfonate groups, to a process for their production by the at least partial carbodiimidization of organic polyisocyanates followed by reaction of any free isocyanate groups still present with compounds containing isocyanate-reactive groups (the starting materials and/or reactants used being inter alia compounds containing sulfonate groups) and to the use of the isocyanate derivatives containing sulfonate groups as additives for aqueous dispersions or solutions of plastics containing incorporated carboxyl groups and/or incorporated groups convertible to carboxyl groups.

Description of the Prior Art

Aqueous solutions or dispersions of ionically modified plastics are known in large numbers. Thus, the production of polyurethane dispersions or solutions optionally containing urea groups is described, for example, in DE-PS Nos. 1,178,586, 1,184,946, DE-OS Nos. 1,495,745, 1,770,068, 2,314,512, 2,446,440, 2,543,091, 2,642,073, U.S. Pat. Nos. 3,480,592, 3,388,087, 3,479,310, 3,756,992, 3,905,929 and in "Angewandte Chemie" 82, 53 et seq (1970).

The production of aqueous or water-dilutable polycondensates, more especially polyester resins, optionally containing organic solvents and/or urethane groups, is also known (cf. DE-OS No. 2,225,646, DE-AS No. 2,239,094, DE-OS No. 2,446,439, U.S. Pat. Nos. 3,876,582, 4,029,617, cf. also Houben-Weyl "Methoden der Organishen Chemie" XIV/2 (1963), pages 30 et seq).

The production of polymers, more especially polyacrylates, containing incorporated ionic groups is also known (cf. for example Houben-Weyl "Methoden der Organischen Chemie" XIV/1 (1961), pages 103 et seq or XIV/2 (1963), page 754).

The solubility or dispersibility of these plastics in water is often ensured by carboxylate groups chemically incorporated in the plastics which contain as counterions ammonium cations based on ammonia or thermally volatile organic amines. When drying the sheet-form materials (coatings) produced from solutions and, more especially, dispersions of the type in question (which is generally carried out by heating), many of the carboxylate groups originally present are converted into carboxyl groups through elimination of the ammonia or amine counterion, the carboxyl-containing plastics then present often show unsatisfactory resistance to water. In addition, these carboxyl groups catalytically accelerate the obviously undesirable hydrolytic degradation of plastics containing ester groups which can result in rapid deterioration of the mechanical properties of the above-mentioned sheet-form materials, especially in a damp atmosphere.

Accordingly, the object of the present invention is to provide an additive for aqueous solutions and, more especially, dispersions of plastics containing carboxyl groups and/or carboxylate groups convertible into carboxyl groups which ensures that, before or during drying of the sheet-form materials produced from the solutions or dispersions, the carboxyl groups are converted into largely non-hydrophilic groups which have no catalytic effect on the hydrolytic degradation of any ester groups present in the plastics. At the same time, the conversion of the carboxyl groups into the non-hydrophilic groups mentioned is to be accompanied by crosslinking of the sheet-form material in order thus to improve its mechanical properties and, in particular, its wet strength.

This object is achieved by providing isocyanate derivatives containing carbodiimide groups according to the invention which are described in more detail hereinafter. Although hydrophilic groups are also present in the isocyanate derivatives according to the invention, the concentration in which they are present is generally considerably lower so that, through the use of the additives according to the invention, the hydrophilicity of the plastics can be very considerably reduced (i) by reducing the total concentration of hydrophilic groups and (ii) through the crosslinking effect mentioned above.

SUMMARY OF THE INVENTION

The present invention relates to isocyanate derivatives which contain about 2 to 30% by weight of carbodiimide groups —N=C=N—, on a statistical average at least about 0.8 carbodiimide groups per molecule, about 5 to 200 milliequivalents per 100 g of solids of chemically incorporated sulfonate groups and, optionally, 0 to about 25% by weight, based on solids, of chemically incorporated ethylene oxide units —CH$_2$—CH$_2$—O— in polyether chains.

The present invention also relates to a process for producing the isocyanate derivatives containing carbodiimide groups by at least partial carbodiimidization of the isocyanate groups of a) organic polyisocyanates or a mixture of organic poly- and monoisocyanates having an average NCO-functionality of about 1.3 to 2.5 followed by reaction of any free isocyanate groups still present in the carbodiimidization product with b) mono- and/or polyfunctional compounds containing isocyanate-reactive groups in such an equivalent ratio that, for every isocyanate group, there is at least one isocyanate-reactive group, characterized in that at least a portion of the compounds used as components a) and/or b) are compounds containing chemically incorporated sulfonate groups or groups convertible into sulfonate groups by a neutralization reaction, any groups convertible in sulfonate groups still present on completion of the reaction being completely or partly converted into sulfonate groups by neutralization, the type of and quantitative ratios between the reactants, the degree of carbodiimidization and, optionally, the degree of neutralization being selected in such a way that the end products have the above-mentioned contents of carbodiimide and sulfonate groups.

The present invention also relates to the use of the isocyanate derivatives containing carbodiimide groups as additives for aqueous dispersions or solutions of plastics containing carboxyl groups and/or groups convertible into carboxyl groups.

DETAILED DESCRIPTION OF THE INVENTION

U.S. Pat. No. 2,937,164 describes certain monocarbodiimides as "crosslinkers" for linear, synthetic polymers containing carboxyl or sulfonyl groups. However, there is no mention of carbodiimides containing sulfonate groups of the same type as the products according to the invention. In addition, the described monocarbodiimides are attended by the disadvantage that they are monofunctional in their reactivity to carboxyl groups and, accordingly, are not crosslinkers in the strict sense of the term.

EP-OS No. 121,083 describes the use of aliphatic, cycloaliphatic or aliphatic-cycloaliphatic polycarbo-diimides for latices containing carboxyl groups. Once again, there is no mention of carbodiimides containing sulfonate groups of the type according to the invention. In addition, it is emphasized in this prior publication that aromatic carbodiimides are not suitable for the stated purpose; whereas, according to the invention, aromatic carbodiimides in particular are especially suitable as discussed in more detail hereinafter. In addition, if the polycarbodiimides described in EP-OS No. 121,083 are to be used in aqueous systems, the products have to be converted into aqueous emulsions by means of external emulsifiers using special stirring units. Not only is this very expensive, it is also attended by the disadvantage that, in the sheet-form material ultimately obtained, the chemically non-fixed emulsifiers migrate to the surface where they can give rise to undesirable effects. It is stated in EP-OS No. 121,083 that the polycarbodiimides may be converted into a cationically modified salt by reaction with dimethylaminopropylamine and subsequent salt formation with p-toluene sulfonic acid methylester or with dimethyl sulfate which makes the products soluble in water so that there is no need to use an external emulsifier. However, the disadvantage of this procedure is that in combination with anionic dispersions, the cationically modified additives, inevitably lead to compatibility problems. Thus, there is no Example in EP-OS No. 121,083 which relates to the use of a cationically modified additive as crosslinker for dispersions containing carboxylate groups.

The isocyanate derivatives described in detail hereinafter are favorably distinguished in many respects from the above-mentioned state-of-the-art additives containing carbodiimide groups:

1. Through the incorporation of (anionic) sulfonate groups and optionally hydrophilic ethylene oxide units, the isocyanate derivatives according to the invention may readily be added to aqueous solutions and, more especially, dispersions of plastics containing carboxylate and/or carboxyl groups.
2. The degree of crosslinking of the sheet-form material ultimately obtained may be adjusted according to the carbodiimide group content of the additives according to the invention which may readily be varied according to the type of and quantitative ratios between the starting materials used.
3. The isocyanate derivatives containing carbodiimide groups according to the invention which are suitable for the use according to the invention are not confined to those containing aliphatically or cycloaliphatically bound carbodiimide groups. Instead, it has been found that compounds according to the invention of which the carbodiimide groups are aromatically bound, i.e. which may be produced from inexpensive aromatic starting isocyanates, are particularly suitable for the above-mentioned application.

Starting materials for the process according to the invention are (a) organic polyisocyanates having an (average) NCO-functionality of about 2.0 to 2.5 or mixtures of organic poly- and monoisocyanates having an average NCO-functionality of about 1.3 to 2.5 and, optionally, (b) compounds containing isocyanate reactive groups and having a functionality of one or higher in the context of the isocyanate addition reaction, being used as at least a portion of starting materials (a) and/or (b) being compounds containing sulfonate groups.

The synthesis components (a) include (a1) any aliphatic, cycloaliphatic, araliphatic, aromatic or heterocyclic polyisocyanates of the type described, for example, by W. Siefken in Justus Liebigs Annalen der Chemie, 562, pages 75 to 136. Preferred polyisocyanates (a1) include the commercially available diisocyanates such as hexamethylene diisocyanate, 1-isocyanato-3,3,5-trimethyl-5-isocyanatomethylcyclohexane and, in particular, aromatic diisocyanates such as 2,4- and, optionally, 2,6-diisocyanatotoluene or 4,4'- and, optionally, 2,4'-diisocyanatodiphenylmethane, 3,4'-diisocyanato-4-methyldiphenylmethane or 3,2'-diisocyanato-4-methyldiphenylmethane and isomers thereof or mixtures of these diisocyanates. However, particularly preferred diisocyanates are phenylene diisocyanates sterically hindered by alkyl substituents such as 1-methyl-3,5-diethyl-2,4-diisocyanatobenzene, 1-methyl-3,5-diethyl-2,6-diisocyanatobenzene and mixtures of these two diisocyanates, 1,3,5-triisopropyl-2,4-diisocyanatobenzene or alkyl-substituted phenylene diisocyanates of the type described, for example, in U.S. Pat. No. 3,105,845 or DE-OS No. 3,317,649.

Other starting materials (a) include (a2) hydrophilically modified polyisocyanates, including both polyisocyanates containing sulfonate groups or groups convertible into sulfonate groups by a neutralization reaction of the type described, for example, in U.S. Pat. No. 3,959,329 and also mono- or diisocyanates containing ethylene oxide units incorporated in polyether chains of the type described in DE-OS Nos. 2,314,512, 2,314,513, 2,551,094, 2,651,506, U.S. Pat. Nos. 3,920,598 or 3,905,929. The sulfonated diisocyanate obtained by reaction of 2,4-diisocyanatotoluene with equimolar quantities of chlorosulfonic acid at room temperature in the presence of solvents such as 1,2-dichloroethane, is another suitable compound containing groups convertible into sulfonate groups with neutralizing agents such as triethylamine. Where compounds such as these are used as component (a2), the neutralization step is carried out after the reaction.

However, particularly preferred hydrophilically modified polyisocyanates are NCO-prepolymers of the type obtained by reaction of excess quantities of the diisocyanates mentioned by way of example under (a1), especially the sterically hindered phenylene diisocyanates, with diols containing sulfonate groups. In the production of these NCO-prepolymers, the starting materials are generally reacted in an NCO:OH-equivalent ratio of about 1.2:1 to 10:1 at a temperature of about 20° to 150° C. Diols containing sulfonate groups which are particularly suitable for the production of the NCO-prepolymers are, in particular, those corresponding to the following general formula

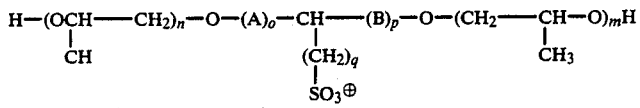

in which
- A and B may be the same or different and represent difunctional aliphatic hydrocarbon radicals containing 1 to 6 carbon atoms,
- R represents hydrogen, an aliphatic hydrocarbon radical containing 1 to 4 carbons or a phenyl radical,
- $X^{\oplus}$ represents an alkali metal cation or an optionally substituted ammonium group,
- n and m may be the same or different and represent numbers from 0 to about 30,
- o and p each have a value of 0 or 1 and
- q is an integer from 0 to 2.

The production of these sulfonate diols is described, for example, in DE-AS No. 2,446,440 and in U.S. Pat. No. 4,108,814. Particularly preferred sulfonate diols of this type are those in which m and n may be the same or different and each have a value from 0 to 3.

Further starting materials (a) include (a3) organic monoisocyanates such as n-hexylisocyanate, phenylisocyanate or p-tolylisocyanate. As already mentioned, however, these monoisocyanates are used in admixture with organic polyisocyanates of the type mentioned by way of example, the mixture having an average NCO-functionality of about 1.3 to 2.5 and preferably of about 1.3 to 2.

Component (a) may also contain other modified polyisocyanates, for example reaction products of excess quantities of organic diisocyanates of the type mentioned by way of example under (a1) with di- or trihydroxyalkanes having a molecular weight below about 400 such as ethylene glycol, propylene glycol, tetramethylene diol, hexamethylene diol, trimethylol propane and/or glycerol.

The synthesis components (b) optionally used in the process according to the invention include (b1) polyhydric, more especially dihydric alcohols having a molecular weight below about 400 such as for example ethylene glycol, propylene glycol, tetramethylene diol, hexamethylene diol, octamethylene diol, neopentyl glycol, 2-methyl-1,3-dihydroxypropane, glycerol, trimethylol propane, diethylene glycol, triethylene glycol, tetraethylene glycol, polyethylene glycols having a molecular weight in the above-mentioned range, dipropylene glycol, tripropylene glycol or mixtures of these polyhydric alcohols.

Other optional synthesis components (b) include (b2) polyfunctional, preferably difunctional amines having a molecular weight below about 400 and containing at least two primary and/or secondary amino groups such as 1,2-diaminoethane, hexamethylene diamine, piperazine, 1-amino-3-aminomethyl-3,5,5-trimethylcyclohexane, 4,4'-diaminodicyclohexylmethane or mixtures of these amines. The use of amines such as these is less preferred than the hydroxyl-containing components (b).

Other optional synthesis components (b) include (b3) hydrophilically modified monohydric or dihydric alcohols such as the sulfonate diols already mentioned by way of example under (a2) or even compounds containing ethylene oxide units corresponding to the following general formula

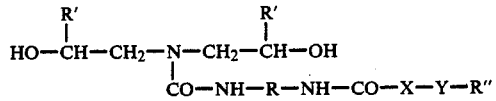

in which
- R represents a difunctional radical of the type obtained by removing the isocyanate groups from a diisocyanate R(NCO)₂ of the type mentioned above under (a1),
- R' represents hydrogen or a monofunctional hydrocarbon radical containing 1 to 8 carbon atoms, preferably hydrogen or a methyl group,
- R" represents a monofunctional hydrocarbon radical containing 1 to 12 carbon atoms, preferably an unsubstituted alkyl radical containing 1 to 4 carbon atoms,
- X represents a plyalkylene oxide chain which contains about 5 to 90 and preferably about 20 to 70 members of which at least about 40% and preferably at least about 65% are ethylene oxide units which, in addition to ethylene oxide units, may also contain propylene oxide, butylene oxide or styrene oxide units, propylene oxide units being preferred,
- Y represents oxygen or —NR'"— where R'" corresponds in its definition to R'.

The compounds corresponding to the above formulae may be produced by the methods described in DE-OS Nos. 2,314,512 and 2,314,513, in addition to the respective disclosures of which it is pointed out that, instead of the monohydric polyether alcohols mentioned therein as starting materials, it is also possible to use polyether alcohols in which the polyether segment—in addition to ethylene oxide units—also contains up to about 60% by weight, based on polyether segment, of propylene oxide, butylene oxide or styrene oxide units, preferably propylene oxide units. In special cases, the presence of "mixed polyether segments" such as these may afford specific advantages.

The hydrophilic monohydric alcohols suitable for use in accordance with the invention include, for example, compounds corresponding to the following formula

H-X-Y-R"

in which X, Y and R" are as just defined.

These monohydric, hydrophilically modified alcohols may be produced by the methods described in U.S. Pat. Nos. 3,905,929 and 3,920,538, for example by the alkoxylation of suitable starter molecules such as n-butanol with ethylene oxide and, optionally, other alkylene oxides such as propylene oxide.

Other optional synthesis components (b) include (b4) aminosulfonates, more especially diaminosulfonates of the type described in CA-PS No. 928,323, in particular the sodium salt of N-(2-aminoethyl)-2-aminoethane sulfonic acid.

Other optional synthesis components (b) include (b5) monohydric alcohols or monofunctional, primary or secondary amines having a molecular weight below about 400. Synthesis components such as these include methanol, ethanol, n-butanol, i-butanol, n-octanol, n-dodecanol, methylamine, ethylamine, n-hexylamine or aniline. These monofunctional components are often used as chain terminators.

Other optional synthesis components (b) include hydrazine, hydrazine hydrate or hydrazine derivatives such as carboxylic acid hydrazides or semicarbazides. Ammonia may also be used as synthesis component (b) and is a particularly suitable chain terminator.

The isocyanate derivatives containing carbodiimide groups according to the invention produced from the starting materials mentioned by way of example contain about 2 to 30% by weight and preferably from 5 to 15% by weight of carbodiimide groups (—N=C=N—) and on a statistical average about 0.8 to 30, preferably about 1 to 25 and most preferably about 1.2 to 20 such carbodiimide groups per molecule. Their content of incorporated sulfonate groups is about 5 to 200, preferably about 5 to 150 and most preferably about 5 to 120 milliequivalents per 100 g solids. Their content of incorporated ethylene oxide units in polyether chains is 0 to about 25, preferably 0 to about 20 and most preferably 0 to about 15% by weight, based on solids. The hydrophilic groups mentioned are preferably present in the compounds according to the invention in such quantities that their solubility or dispersibility in water is guaranteed. However, in addition to the chemically incorporated hydrophilic groups mentioned, it is also possible, although by no means preferred, to use external emulsifiers which are mixed with the compounds according to the invention to guarantee their solubility or dispersibility in water. Emulsifiers such as these include ethoxylated nonylphenol, polyoxyethylene lauryl ether or polyoxyethylene laurate, oleate or stearate. These compounds generally contain about 8 to 50 oxyethylene units per molecule.

The content of the above-mentioned groups essential to the invention in the compounds according to the invention is ensured by appropriately selecting the starting materials, the quantities in which they are used and also the degree of carbodiimidization. In the context of the invention, the degree of carbodiimidization is understood to be the percentage of isocyanate groups in the starting isocyanates (a) which are reacted to form carbodiimide groups. The compounds according to the invention preferably do not contain free isocyanate groups after their production.

The production of the compounds according to the invention, i.e. the process according to the invention, may be carried out in various ways.

The simplest way of carrying out the process according to the invention is to react mixtures of organic polyisocyanates, preferably diisocyanates, with monoisocyanates in such a way that all the isocyanate groups are converted into carbodiimide groups. To this end, isocyanates containing sulfonate groups and, optionally, ethylene oxide units are used in such a quantity that the resulting product has a sulfonate group content within the above-mentioned limits and the quantitative ratio of polyisocyanate to monoisocyanate, i.e. the average NCO-functionality of the isocyanate mixture, is selected in such a way that chain termination takes place during the carbodiimidization reaction, so that the resulting products have a carbodiimide group content within the above-mentioned range. Chain termination always occurs when the average NCO-functionality is below 2.0. Accordingly, it is possible, simply by selecting the average NCO-functionality of the isocyanates used as component (a), to adjust the molecular weight and hence the number of carbodiimide groups present on a statistical average in the end products.

In another variant of the process according to the invention, only some of the isocyanate groups in starting component (a) are carbodiimidized and the free isocyanate groups still present thereafter are reacted with isocyanate-reactive groups of the type mentioned by way of example under (b), the degree of carbodiimidization of the first reaction step being selected in such a way that carbodiimide groups are present in the product ultimately obtained in a quantity corresponding to the amounts mentioned above. In this connection, the quantity in which component (b) is used is always determined in such a way that at least one isocyanate-reactive group is available for every free isocyanate group present in the partly carbodiimidized isocyanate. In this variant of the process according to the invention, the sulfonate groups may be incorporated in the end product both through component (a), for example by using NCO-prepolymers containing sulfonate groups as at least a portion of component (a) and/or through component (b), for example by using a sulfonate diol of the type mentioned by way of example above as at least a portion of component (b) or even by using diaminosulfonates or other compounds containing both isocyanate-reactive groups and incorporated sulfonate groups. In this case, too, the number of carbodiimide groups present on a statistical average in the end products may be determined in advance by suitably selecting the functionality of the starting components, i.e. by an adjustment to the molecular weight made possible in this way. If, for example, the number of carbodiimide groups in the partly carbodiimidized isocyanate is sufficient, the reaction with component (b) need not be accompanied by chain extension, i.e. chain-terminating synthesis components of the type mentioned by way of example are preferably exclusively used as component (b). Conversely, in cases where difunctional synthesis components (b) are at least partly used, a chain-extending reaction may be brought about which naturally increases the number of carbodiimide groups per molecule present on a statistical average in the end products. In this variant of the process according to the invention, component (a) preferably has an NCO-functionality of about 1.8 to 2.5 before the carbodiimidization reaction. It is also possible using this variant to produce valuable end products which, on a statistical average, contain a large number of carbodiimide units corresponding to the details mentioned above with regard to the number of carbo-diimide units.

In the second variant of the process according to the invention, the ethylene oxide units optionally present in the end products are again incorporated in the end product by using a component (a) containing ethylene oxide units and/or by using a component (b) containing ethylene oxide units of the type mentioned by way of example in the foregoing.

In both variants of the process according to the invention, the isocyanate groups in component (a) are at least partly carbodiimidized in known manner, for example by any of the methods known from the prior art as represented, for example, by U.S. Pat. Nos. 2,840,589 and 2,941,966 or by DE-OS Nos. 2,504,400, 2,552,350 and 2,653,120. The at least partial carbodiimidization of the isocyanate groups in component (a) is carried out with particular advantage using carbodiimidization catalysts of the type described, for example, in U.S. Pat. Nos. 2,941,966, 2,853,518 and 2,853,473 or in DE-OS No. 2,614,323. Particularly preferred carbodiimidization catalysts are 1-methyl-1-phospha-2-cyclopentene-1-oxide or 1-methyl-1-phospha-3-cyclopentene-1-oxide or mixtures of these compounds. Any other state-of-the-art carbo-diimidization catalysts may of course also be used. The at least partial carbodiimidization of component (a) is generally carried out using about 0.001 to 5% by weight and preferably about 0.02 to 2% by weight, based on component (a), of carbodiimidization catalysts of the type mentioned by way of example at a temperature of about 0° to 200° C. and preferably at a temperature of about 20° to 150° C. If only some of the isocyanate groups in component (a) are to be carbodiimidized, it is advisable to terminate the carbodiimidization reaction at the desired degree of carbodiimidization by adding a catalyst poison. Suitable catalyst poisons are described, for example, in DE-OS No. 2,614,323.

Preferred catalyst poisons, which are particularly suitable for deactivating the phospholine oxides mentioned by way of example above, include phosphorus trichloride, phosphorus pentachloride or thionyl chloride. The catalyst poisons are generally used in a quantity of at least 100 mole %, based on the catalyst.

In order to obtain partly carbodiimidized isocyanates that are stable in storage at room temperature, it may even be advisable to carry out the carbo-diimidization reaction at about 50° to 200° C. using catalysts which only develop their catalytic activity in this elevated temperature range. Catalysts such as these are described, for example, by I. I. Monagle in J. Org. Chemistry 27, 3851 (1962). After the required degree of carbodiimidization has been reached, the reaction may be terminated simply by cooling.

The progress of the carbodiimidization reaction may be followed from the evolution of carbon dioxide and also from the reduction in the NCO-content of the reaction mixture. In general, the end products obtained in the event of partial carbodiimidization are not individual carbodiimides, but instead mixtures of carbodiimides having different contents of carbodiimide units per molecule and optionally containing unreacted starting isocyanate. Accordingly, all of the above-mentioned values regarding the carbodiimide group content of the end products and regarding the number of carbodiimide groups per molecule in the end products are based on statistical averages.

The carbodiimidization reaction may be carried out in the presence or absence of solvents. Examples of suitable solvents are benzene, toluene, xylene, cyclohexane, chlorobenzene, o-dichlorobenzene, dimethyl formamide, perchloroethylene, ethylacetate, butylacetate, diethylene glycol dimethylether, tetrahydrofuran, acetone, methylethylketone, cyclohexanone and mixtures of these solvents. The carbodiimidization product produced in the absence of a solvent often solidifies into a hard resin which may be ground into a powder and subsequently used in accordance with the invention or further processed by reaction with component (b).

The reaction with component (b) which may be carried out after the carbodiimidization reaction also takes place in the presence or absence of solvents of the type mentioned by way of example at a temperature of about 0° to 150° C. and preferably at a temperature of about 20° to 100° C. Where a different component (b) is used, the reaction components may be reacted both simultaneously and also successively, the ratio of the isocyanate groups in the partly carbodiimidized component (a) to the isocyanate-reactive groups being about 1:1 to 1:5 and preferably about 1:1 to 1:2. A particularly preferred procedure is one in which diisocyanates free from sulfonate groups of the type mentioned by way of example are used as component (a). The carbodiimidization reaction is carried out to such a degree that the necessary quantity of carbodiimide groups is present in the product ultimately obtained and the partly carbodiimidized diisocyanate or diisocyanate mixture thus obtained is reacted with difunctional compounds (b) containing sulfonate groups and, optionally, with difunctional compounds (b) containing ethylene oxide units in an equivalent ratio of isocyanate groups to isocyanate-reactive groups of about 1.05:1 to 10:1. The free isocyanate groups still present thereafter are reacted with chain terminators of the type mentioned by way of example under (b) in an equivalent ratio of isocyanate groups to isocyanate-reactive groups of about 1:1 to 1:1.5, preferably about 1:1, or with a large excess of chain-extending agents of the type described under (b), preferably maintaining an equivalent ratio of isocyanate groups to isocyanate-reactive groups of at least 1:2, so that an NCO-free product is formed. In another procedure largely equivalent to this particularly preferred procedure, the partly carbodiimidized diisocyanates are reacted with a mixture of difunctional hydrophilic synthesis components and chain terminators while maintaining an equivalent ratio of isocyanate groups to isocyanate-reactive groups of about 1:1 to 1:1.5.

After the reaction, the solvent used, if any, may be removed, for example by distillation. The solvent-free reaction product is generally a solid which may be taken up at any time in an organic solvent or which may even be used in accordance with the invention without using solvents. To this end, the compounds according to the invention may be added to the plastics dispersions in the form of aqueous solutions or dispersions or even as solids.

The compounds according to the invention are used in particular as additives for aqueous solutions and, more especially, dispersions of plastics containing carboxylate groups and/or carboxyl groups, the counterions of the carboxylate groups preferably being ammonium cations based on ammonia or on thermally volatile amines. The use according to the invention is particularly suitable for modifying polyurethanes containing carboxylate and/or carboxyl groups dissolved or dispersed in water, although it is also suitable for modifying polyester resins, polybutadienes or polyacrylate resins containing carboxylate groups of the above-mentioned type and/or carboxyl groups in the form of solutions or dispersions in water. The quantity in which the additives according to the invention are used is determined on the one hand by the carboxylate and/or carboxyl group content of the dissolved or dispersed polymer and, on the other hand, by the desired property spectrum of the sheet-form material ultimately obtained from the solutions or dispersions. Thus, on the one hand, it may be desirable for the ratio of carboxylate groups and/or carboxyl groups in the dissolved or dispersed plastic to carbodiimide groups in the additive to be greater than 1:1 in order to avoid excessive crosslinking of the product, particularly where additives containing more than two carbodiimide groups per molecule are used. On the other hand, the reaction time during the drying of the sheet-form materials ultimately obtained may be shortened by using at least equivalent quantities of carbodiimide groups, particularly in the case of (on a statistical average) at least difunctional carbodiimides.

The solutions or dispersions of polymers containing carboxylate groups of the type mentioned and/or carboxyl groups, more especially the corresponding aqueous polyurethane dispersions, which have a total content of carboxylate groups and carboxyl groups of about 0.2 to 200 milliequivalents per 100 g of solids and also containing the additives according to the invention, may be processed in the usual way at room temperature or at elevated temperature and dried to form sheet-form materials. The particular drying temperature to be applied, which depends above all upon the chemical composition of the material, may be determined by a simple preliminary test and is generally about 20° to 150° C.

Aqueous solutions, preferably dispersions of plastics containing carboxylate groups and, optionally, carboxyl groups, more especially polyurethanes, which contain the additives according to the invention may be used with particular advantage for the production of high-quality coatings on a variety of different substrates such as leather, textiles, paper, wood, metals, glass and plastics. The coatings ultimately obtained being considerably more water-resistant compared with systems which have not been modified in accordance with the invention.

In the following examples, all the percentages are percentages by weight.

EXAMPLES

EXAMPLE 1

178 parts by weight (0.775 mole) of a mixture of 3,5-diethyl-2,4-tolylene diisocyanate and 3,5-diethyl-2,6-tolylene diisocyanate (ratio 7:3) were reacted with 118 parts by weight (0.275 mole) of a propoxylated adduct of 2-butene-1,4-diol and $NaHSO_3$ (molecular weight 430) for 70 minutes at 80° C. to an NCO-value of 14.19%. The reaction product was cooled to 80° C. and diluted with 200 parts by weight of N-methyl pyrrolidone. After the addition of 59.5 parts by weight (0.5 mole) of phenylisocyanate, the carbodiimidization reaction was started with 5 ml of a 25% solution of a technical mixture of 1-methyl-1-phospha-2-cyclopentene-1-oxide and 1-methyl-1-phospha-3-cyclopentene-1-oxide in N-methyl pyrrolidine ("phospholine oxide"), the temperature being increased to 120° C. After a reaction time of 5 hours, the NCO-content had fallen to 0%. After cooling to 60° C., the reaction was terminated by adding 2 ml of phosphorus trichloride.

A solution was obtained which had a solids content of 61% by weight, a carbodiimide group ($-N=C=N-$) content of 9.0% by weight, based on solids, and an $SO_3$-ion content of 88 milliequivalents per 100 g of solids. The product contained on average 3 carbodiimide units per molecule.

EXAMPLE 2

186 parts by weight (0.65 mole) of 1,3,5-triisopropylbenzene-2,4-diisocyanate were reacted with 137 parts by weight (0.3175 mole) of a propoxylated adduct of 2-butene-1,4-diol and $NaHSO_3$ (molecular weight 430) for 120 minutes at 100° C. to an NCO-value of 9.38%. The reaction product was diluted with 200 parts by weight of N-methyl pyrrolidone, followed by the addition of 39.6 parts by weight of phenyl isocyanate, after which the carbodiimidization was started with 5 ml of the phospholine oxide solution mentioned in Example 1 as the temperature being increased to 120° C. After a reaction time of 6 hours, the NCO-value had fallen to 0%. After cooling to 60° C., the reaction was terminated by adding 1.2 ml of phosphorus trichloride.

A solution was obtained which had a solids content of 64% by weight, a carbodiimide group ($-N=C=N-$) content of 5.8% by weight, based on solids, and an $SO_3$-ion content of 88 milliequivalents per 100 g of solids. The product contained on average 3 carbodiimide units per molecule.

EXAMPLE 3

34.7 parts by weight (0.09 mole) of a reaction product of a butanol-started polypropylene-polyethylene glycol polyether (molar ratio of propylene oxide to ethylene oxide in the alkylene oxide mixture used=17:83, OH number 26) with 2,4-tolylene diisocyanate (ethylene oxide unit content 50% by weight, NCO content 21.8% by weight) and 94.3 parts by weight (0.41 mole) of a mixture of 3,5-diethyl-2,4-tolylene diisocyanate and 3,5-diethyl-2,6-tolylene diisocyanate (ratio 7:3) were carbodiimidized at 100° C. in the presence of 0.5 ml of a 15% solution of phospholine oxide in N-methyl pyrrolidone as catalyst. At an NCO-value of 13.7%, the reaction mixture was cooled to 60° C. and the reaction was terminated with 0.2 ml of phosphorus trichloride. The NCO-content settled at a constant 13.1%. After heating to 100° C., 67.6 parts by weight of a propoxylated adduct of 2-butene-1,4-diol and $NaHSO_3$ (molecular weight 430, 70% in N-methyl pyrrolidone) and 10.3 parts by weight of n-butanol were added and the reaction was continued to an NCO-value of 0%. The reaction product obtained was diluted with 95 parts by weight of N-methyl pyrrolidone. A solution was obtained which had a solids content of 68% by weight, a carbodiimide group ($-N=C=N-$) content of 7.4% by weight, based on solids, an ethylene oxide unit content of 10% by weight, based on solids, and an $SO_3$-ion content of 64 milliequivalents per 100 g of solids. The product contained on average 4.6 carbo-diimide units per molecule.

EXAMPLE 4

115 parts by weight (0.5 mole) of a mixture of 3,5-diethyl-2,4-tolylene diisocyanate and 3,5-diethyl-2,6-tolylene diisocyanate (ratio 7:3) were carbodiimidized at 120° C. with 0.5 ml of the phospholine oxide solution mentioned in Example 3 as catalyst. At an NCO-value of 14.5%, the reaction mixture was cooled to 60° C. and the reaction was terminated by adding 0.2 ml of phosphorus trichloride. The NCO-value settled at a constant 14.0%. After heating to 80° C., 67.6 parts by weight of a propoxylated adduct of 2-butene-1,4-diol and $NaHSO_3$ (molecular weight 430, 70% in N-methyl pyrrolidone), 7.2 parts by weight (0.097 mole) of n-butanol and 23.8 parts by weight of a butanol-started polypropylene-polyethylene glycol polyether (molar ratio of propylene oxide to ethylene oxide in the alkylene oxide mixture used 17:83, OH number 26) were added, after which the reaction mixture was diluted with 98.8 parts by weight of N-methyl pyrrolidone and reacted to an NCO-value of 0%.

A solution was obtained which had a solids content of 60% by weight, a carbodiimide group ($-N=C=N-$) content of 7.45% by weight, based on solids, an $SO_3$-ion content of 61 milliequivalents per 100 g of solids and an ethylene oxide unit content of 10.4% by weight, based on solids. The product contained on average 6.2 carbodiimide units per molecule.

EXAMPLE 5

115 parts by weight (0.5 mole) of a mixture of 3,5-diethyl-2,4-tolylene diisocyanate and 3,5-diethyl-2,6-tolylene diisocyanate (ratio 7:3) were carbodiimidized at 100° C. with 0.5 ml of the phospholine oxide solution mentioned in Example 3 as catalyst. At an NCO-value of 20.8%, 50.8 parts by weight (0.2 mole) of sulfonated 2,4-diisocyanatotoluene dissolved in 102 parts by weight of N-methyl pyrrolidone, 35.7 parts by weight (0.3 mole) of phenylisocyanate and 4 ml of the catalyst solution were added and the reaction mixture was diluted with 170 parts by weight of N-methyl pyrrolidone. The sulfonated diisocyanate was prepared by reacting equimolar quantities of 2,4-diisocyanatotoluene and chlorosulfonic acid at room temperature using 1,2-dichloroethane as solvent. During the reaction in the solvent mentioned, the sulfonation product precipitates as a solid. To complete the reaction according to the invention, the reaction mixture was carbodiimidized to an NCO-value of 0%, after which the catalyst was destroyed with 1 ml of thionyl chloride. 20.2 parts by weight (0.2 mole) of triethylamine were then added for salt formation and the NCO-groups released were reacted with 14.8 parts by weight (0.2 mole) of n-butanol.

A solution was obtained which had a solids content of 42% by weight, a carbodiimide group (—N=C=N—) content of 13.3% by weight, based on solids, and an $SO_3$-ion content of 103 milliequivalents per 100 g of solids. The product contained on average 3 carbodiimide units per molecule.

EXAMPLE 6

111 parts by weight (0.5 mole) of isophorone diisocyanate were carbodiimidized at 140° C. with 1 part by weight of the catalyst solution mentioned in Example 1. At an NCO-value of 14.7%, the reaction mixture was cooled to 60° C., the reaction was terminated by adding 0.5 part by weight of phosphorus trichloride and the reaction product was diluted with 150 parts by weight of N-methyl pyrrolidine. The NCO value settled at a constant 5.6%. 86 parts by weight (0.14 mole) of a propoxylated adduct of 2-butene-1,4-diol and $NaHSO_3$ (molecular weight 430, 70% in N-methyl pyrrolidone) and, after 10 minutes, 3.6 parts by weight (0.05 mole) of n-butanol were added to the reaction mixture which was then reacted to an NCO-value of 0%.

A solution was obtained which had a carbodiimide group (—N=C=N—) content of 8.5% by weight, based on solids, and an $SO_3$-ion content of 88 milliequivalents per 100 g of solids. The product contained on average 14.4 carbodiimide units per molecule.

EXAMPLE 7

115 parts by weight (0.5 mole) of a mixture of 3,5-diethyl-2,4-tolylene diisocyanate and 3,5-diethyl-2,6-tolylene diisocyanate (ratio 7:3) were carbodiimidized at 120° C. with 0.2 ml of the catalyst solution mentioned in Example 3. At an NCO-value of 26.0%, the reaction mixture was cooled to 60° C. and the reaction was terminated by adding 0.2 ml of phosphorus trichloride. The NCO-value settled at a constant 26.3%. After heating to 100° C., 103.4 parts by weight (0.16 mole) of a propoxylated adduct of 2-butene-1,4-diol and $NaHSO_3$ (molecular weight 430, 70% in N-methyl pyrrolidone) and 25.0 parts by weight (0.34 mole) of n-butanol were added, after which the reaction mixture was diluted with 106 parts by weight of N-methyl pyrrolidone and reacted to an NCO-value of 0%.

A solution was obtained which had a solids content of 60% by weight, a carbodiimide group (—N=C=N—) content of 2.9% by weight, based on solids, and an $SO_3$-ion content of 82 milliequivalents per 100 g of solids. The product contained on average 0.9 carbodiimide units per molecule.

EXAMPLE 8

115 parts by weight (0.5 mole) of a mixture of 3,5-diethyl-2,4-tolylene diisocyanate and 3,5-diethyl-2,6-tolylene diisocyanate (ratio 7:3) were carbodiimidized at 120° C. with 0.5 ml of the catalyst solution mentioned in Example 3. At an NCO-value of 14.5%, the reaction mixture was cooled to 60° C. and the reaction was terminated by the addition of 0.21 ml of phosphorus trichloride. The NCO-value settled at a constant 14.1%. After heating to 80° C., 88.6 parts by weight (0.14 mole) of a propoxylated adduct of 2-butene-1,4-diol and $NaHSO_3$ (molecular weight 430, 70% in N-methyl pyrrolidone) and 3.5 parts by weight (0.05 mole) of n-butanol were added, after which the reaction mixture was diluted with 100 parts by weight of acetone and reacted to an NCO-value of 0%. The acetone was then distilled in vacuo and the solid ground to a powder.

The solid obtained had a carbodiimide group (—N=C=N—) content of 8% by weight, based on solids, and an $SO_3$-ion content of 88 milliequivalents per 100 g of solids. The product contained on average 14.1 carbo-diimide units per molecule.

EXAMPLE 9

174 parts by weight (1.0 mole) of 2,4-tolylene diisocyanate were dissolved in 200 parts by weight of methyl glycol acetate and 0.05 parts by weight of a technical mixture of 1-methyl-1-phospha-2-cyclopentene-1-oxide and 1-methyl-1-phospha-3-cyclopentene-1-oxide were added to the resulting solution at room temperature, followed by heating to 80° C. The degree of carbodiimidization was followed by the evolution of $CO_2$ and from the reduction in the NCO-content. At an NCO-content of 6.5%, the reaction mixture was cooled to 60° C. and the reaction was terminated by adding 0.1 part by weight of phosphorus trichloride. After another 30 minutes, the NCO-content settled at a constant value. Analysis of the reaction product: NCO-value: 6.35% NCN-units per molecule (average value): 2.87

The reaction mixture obtained was diluted with 300 parts by weight of methyl glycol acetate and 83.54 parts by weight (0.136 mole) of a propoxylated adduct of 2-butene-1,4-diol and $NaHSO_3$ (MW 430, 70% in toluene) and, after 10 minutes, 18.1 parts by weight (0.244 mole) of n-butanol were added at 80° C. to the reaction mixture which was then reacted to an NCO-value of 0%. A solution was obtained which had a carbodiimide group (—N=C=N—) content of 12.5%, based on solids, and an $SO_3^{\ominus}$-ion content of 63 milliequivalents per 100 g of solids. The product contained on average 6.1 carbodiimide units per molecule.

EXAMPLE 10

174 parts by weight (1.0 mole) of 2,4-tolylene diisocyanate were dissolved in 200 parts by weight of acetone and, after the addition at room temperature of 0.1 parts by weight of a technical mixture of 1-methyl-1-phospha-2-cyclopentene-1-oxide and 1-methyl-1-phospha-3-cyclopentene-1-oxide, the resulting solution was heated to 80° C. The degree of carbodiimidization was followed by the evolution of $CO_2$ and from the reduction in the NCO-content. At an NCO-content of 6.6%, the reaction mixture was cooled to 60° C. and the reaction was terminated by the addition of 0.2 part by weight of phosphorus trichloride. After another 30 minutes, the NCO-content settled at a constant value. Analysis of the reaction product: NCO-value: 6.38% NCN-units per molecule (average value): 2.85

After the addition at 80° C. of 90.3 parts by weight (0.21 mole) of a propoxylated adduct of 2-butene diol and NaHSO₃ (molecular weight 430, 70% in toluene) and, after 10 minutes, 7.31 parts by weight (0.099 mole) of n-butanol were added at 80° C. to the reaction mixture which was then reacted to an NCO-value of 0%. 557 parts by weight of water were then added and the acetone was distilled off. An aqueous solution was obtained which had a solids content of 32.7%, a carbodiimide group (—N=C=N—) content of 11.7%, based on solids, and an SO₃⁻-ion content of 88 milliequivalents per 100 g of solids. The product contained on average 15.1 carbo-diimide units per molecule.

The performance tests summarized in the following Table were intended to demonstrate the mode of operation of the additives according to the invention. For the performance tests, the additives containing carbodiimide groups were reacted with standard commercial dispersions containing carboxyl groups or potential carboxyl groups (carboxylate groups containing volatile triethylammonium counter-ions). The following dispersions were tested as representative of their class: Dispersion A: Euderm Grund 25 A (a product of Bayer AG), an aqueous acrylate dispersion having a dry matter content of 40% and a carboxyl group content of 136 milliequivalents per 100 g of solids. Dispersion B: Euderm Resin 50 B (a product of Bayer AG), an aqueous polybutadiene dispersion having a dry matter content of 40% and a carboxyl group content of 91 milliequivalents per 100 g of solids. Dispersion C: Bayderm Finish 60 UD (a product of Bayer AG), an aqueous polyurethane dispersion having a dry matter content of 40% and a carboxylate group (volatile triethylammonium counter-ions) content of 29 milliequivalents per 100 g of solids.

The dispersions were stirred with the quantities indicated in the following Table of the additives according to the invention corresponding to Examples 1, 5 or 10 above and films were drawn from the mixtures onto a glass plate using a 1000 μ doctor. The films were dried at the particular temperatures indicated and then tested for tensile strength, breaking elongation and 100%-modulus. To test their wet strength, the films were stored in water for 24 hours before the measurements and measured immediately afterwards without redrying. The results are shown in the following Table, in which tensile strength is expressed in MPa, breaking elongation in %, 100%-modulus in MPa, drying temperatures in °C. and drying time in minutes. The quantity of additive used is expressed in % of the solution of the particular example, based on the dispersion used.

TABLE 1

(Testing in accordance with DIN 53 504)

| Disp. | Additive Example | % | Drying temp. °C. | time mins. | Before storage in water tensile strength MPa | breaking elongation % | 100%-modulus MPa | After storage in water tensile strength MPa | breaking elongation % | 100%-modulus MPa |
|---|---|---|---|---|---|---|---|---|---|---|
| A | none | | 60 | 100 | 2.8 | 800 | — | — | 950 | — |
| A | none | | 120 | 30 | 4.3 | 800 | — | 1.1 | 950 | — |
| A | 1 | 5 | 60 | 100 | 7.3 | 300 | 1.8 | 2.4 | 300 | — |
| A | 1 | 5 | 120 | 30 | 7.9 | 300 | 2.0 | 3.1 | 300 | 0.4 |
| B | none | | 60 | 100 | 1.6 | 850 | — | 2.1 | 850 | — |
| B | none | | 120 | 30 | 3.7 | 850 | — | 2.6 | 850 | — |
| B | 1 | 5 | 60 | 100 | 4.7 | 500 | 0.4 | 4.2 | 450 | 0.4 |
| B | 1 | 5 | 120 | 30 | 6.4 | 500 | 1.2 | 4.7 | 450 | 0.8 |
| C | none | | 60 | 100 | 11.2 | 450 | 0.5 | 6.7 | 450 | 0.5 |
| C | none | | 120 | 30 | 10.3 | 140 | 1.0 | 2.6 | 140 | — |
| C | 1 | 5 | 60 | 100 | 17.2 | 300 | 2.0 | 10.8 | 350 | 1.5 |
| C | 5 | 6 | 120 | 30 | 28.9 | 300 | 5.5 | 26.1 | 300 | 4.2 |
| C | 10 | 5 | 120 | 30 | 21.6 | 80 | 4.4 | 13.3 | 80 | 2.3 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate derivative which does not contain free isocyanate groups and contains
    (i) a content of carbodiimide groups, —N=C=N—, of about 2 to 30% by weight,
    (ii) on a statistical average at least about 0.8 carbodiimide groups per molecule,
    (iii) about 5 to 200 milliequivalents per 100 g of solids of chemically incorporated sulphonate groups and
    (iv) 0 to about 25%, based on solids, of chemically incorporated ethylene oxide units, —CH₂—CH₂—O—, in polyether chains.

2. The isocyanate derivative of claim 1 which contains
    (i) about 5 to 15% by weight of aromatically-bound carbodiimide groups, and
    (iii) about 5 to 120 milliequivalents per 100 g of solids of chemically incorporated sulfonate groups.

3. A process for producing the isocyanate derivative of claim 1 which comprises partially carbodiimidizing the isocyanate groups of an organic polyisocyanate or a mixture of organic poly- and monoisocyanates (a) having an average NCO functionality of about 1.3 to 2.5 and subsequently reacting the remaining free isocyanate groups present in the carbodiimidization product with mono- and/or polyfunctional compounds containing isocyanate-reactive groups (b) while maintaining an equivalent ratio such that there is at least one isocyanate-reactive group for every isocyanate group, characterized in that a compound containing chemically incorporated sulfonate groups or groups convertible into sulfonate groups by a neutralization reaction is used as at least a portion of component (b), any groups convertible into sulfonate groups still present on completion of the reaction being completely or partly converted into sulfonate groups by a neutralization reaction and wherein the type and quantitative ratios between the reactants used, the degree of carbodiimidization and the degree of neutralization are selected in such a way that the end products have the contents of carbodiimide and sulfonate groups defined in claim 1.

4. The process of claim 3 wherein a compound containing ethylene oxide units incorporated in a polyether chain is used as synthesis component (a) and/or (b) in a quantity such that said isocyanate derivative contains up to about 25% of said ethylene oxide units.

5. A composition which comprises the isocyanate derivative of claim 1 and an aqueous solution or dispersion of plastics containing carboxyl groups and/or groups convertible into carboxyl groups.

* * * * *